United States Patent
Mariaggi et al.

US006824847B2

(10) Patent No.: US 6,824,847 B2
(45) Date of Patent: Nov. 30, 2004

(54) EXPANDABLE AND CURABLE FLEXIBLE PREFORM CONTAINING UNSATURATED RESINS, FOR CASING A WELL OR A LINE

(75) Inventors: Paul Mariaggi, Seyssuel (FR); Dominique Audigier, Vourles (FR); Frédérique Hauviller, Saint-Genis Laval (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 0 days.

(21) Appl. No.: 09/778,880

(22) Filed: Feb. 8, 2001

(65) Prior Publication Data

US 2001/0020053 A1 Sep. 6, 2001

(30) Foreign Application Priority Data

Feb. 8, 2000 (FR) .............................. 00 01617

(51) Int. Cl.$^7$ .............................................. B29D 23/00
(52) U.S. Cl. ................... 428/36.9; 428/36.92; 428/480; 428/482; 428/500; 428/292.1; 428/297.4; 428/299.1; 428/299.4; 428/299.7
(58) Field of Search ............................. 428/36.9, 36.92, 428/480, 482, 500, 292.1, 297.4, 299.1, 299.4, 299.7, 221, 293.4, 295.1, 296.4, 300.1, 300.7, 301.4, 343, 411.1, 34.1; 528/271, 310, 312, 323, 322, 329.1

(56) References Cited

U.S. PATENT DOCUMENTS

| | | | | |
|---|---|---|---|---|
| 4,409,270 A | * | 10/1983 | Faber et al. ................... 428/63 |
| 4,514,447 A | * | 4/1985 | Boxmeyer ..................... 138/93 |
| 5,049,003 A | * | 9/1991 | Barton ........................ 138/97 |
| 5,322,653 A | * | 6/1994 | Muller ........................ 138/97 |
| 5,348,084 A | | 9/1994 | Fay et al. .................... 166/65.1 |
| 5,436,396 A | | 7/1995 | Bailey et al. ................. 523/130 |
| 5,501,248 A | * | 3/1996 | Kiest, Jr. ...................... 138/123 |
| 5,538,791 A | * | 7/1996 | Shustack ...................... 385/123 |
| 5,596,021 A | * | 1/1997 | Adembri et al. .............. 521/108 |
| 5,651,848 A | * | 7/1997 | Cohee et al. .................. 156/93 |
| 5,688,867 A | * | 11/1997 | Scheibelhoffer et al. ..... 524/445 |
| 5,925,409 A | * | 7/1999 | Nava ........................... 427/238 |
| 5,931,199 A | * | 8/1999 | Kittson et al. ................ 138/98 |
| 5,941,286 A | * | 8/1999 | Fauble et al. ................ 138/137 |
| 6,019,136 A | * | 2/2000 | Walsh et al. ................. 138/168 |
| 6,040,009 A | * | 3/2000 | Marutani et al. ........... 427/240 |
| 6,108,998 A | * | 8/2000 | Dumlao ....................... 14/73.1 |

FOREIGN PATENT DOCUMENTS

| | | |
|---|---|---|
| EP | 0 542 584 A1 | 5/1993 |
| FR | 2 753 978 | 4/1998 |
| GB | 2 063 888 A | 6/1981 |
| WO | WO 91/18180 | 11/1991 |
| WO | WO 96/21083 | 7/1996 |
| WO | WO 98/59151 | 12/1998 |

* cited by examiner

*Primary Examiner*—James J. Seidleck
*Assistant Examiner*—Melanie Bissett
(74) *Attorney, Agent, or Firm*—Millen White Zelano Branigan, P.C.

(57) ABSTRACT

A radially deployable flexible preform which, after deploying, forms a tubular structure that is curable by polymerization after positioning it in a well or in a line and moulds to the shape thereof after curing, comprises in its constitution at least one resin comprising in its chemical formula, at least one reactive multiple bond that is capable of subsequent reaction with compounds comprising in their constitution at least one terminal reactive multiple bond or a reactive multiple bond positioned at one end or the other of the molecular chain and/or on a pendant group. The long latent period heat curing resin has a glass transition temperature of at least 90° C. and can be associated with at least one polymerizable oligomer and/or at least one monomer comprising at least one multiple bond in its chemical formula. The resin can also be associated with drying reducers or flow regulators ensuring optimum retention of the fiber/matrix ratio during pressing occurring on deployment of the expandable preform. These compositions optionally comprise post-polymerization shrinkage reducers. Normally, an unsaturated polyester resin or a vinyl ester resin is used, or a mixture of resins usually containing at least one of these resins.

22 Claims, No Drawings

US 6,824,847 B2

EXPANDABLE AND CURABLE FLEXIBLE PREFORM CONTAINING UNSATURATED RESINS, FOR CASING A WELL OR A LINE

FIELD OF THE INVENTION

The present invention relates to a radially deployable or expandable flexible preform for forming, after deploying, a tubular structure that is curable by polymerization after positioning in a well or a line, usually hot, such that it moulds to the shape thereof after curing, normally constituting a casing, which is normally substantially cylindrical.

BACKGROUND OF THE INVENTION AND DESCRIPTION OF THE PRIOR ART

Preforms are already known the walls of which are of flexible materials, that can be folded or compacted on themselves so as to produce a radial dimension that is substantially smaller than the diameter of the well or line to be cased or lined. In the case of a localized repair in a well or pipe, the preform is introduced into the well or line in the folded or compacted state. Once positioned in the desired location, the preform is deployed by outward radial deformation, for example by introducing an inflation fluid such as a gas or a liquid into its interior. The applied pressure causes it to mould to the shape of the well or line. These preforms normally comprise a hot cure resin. In general, the resin forms part of the wall constituting the preform and has usually been introduced by impregnating fibers that contribute to forming that wall. Curing of the resin by hot polymerization can be due to the temperature of the well, but it can also be caused either by introducing a hot fluid into the interior of the preform, or by a Joule effect using suitable electrical resistances disposed in the preform. As an example, electrical resistances forming part of the framework of the wall of the preform impregnated with polymerisable resin can be used. It is also possible to use the heat released by an exothermal reaction that is triggered inside the preform, usually by bringing reactants into contact at the desired moment. It is also possible to introduce a source of electromagnetic radiation, for example microwaves, into the vicinity of the resin.

The preform of the present invention can be positioned and arranged such that cement is not necessary. In the present invention, the term "flexible preform" is defined as any assembly preferably with a polymerization initiation system that can maintain a polymerisable resin forming, after polymerization, a constituent element of the future rigid structure of said preform, in a confined medium, preferably between two skins, external and internal, normally of an elastic material. Examples of such preforms have been described in the following patents: French patent applications Nos. 2,753,978 and 2,722,239, and International patent applications Nos. 94/21,887, 91/18,180 and 94/25,655.

SUMMARY OF THE INVENTION

The preforms of the invention comprise a polymerisable resin having particular characteristics. Particularly when used in wells and in particular in hot oil wells, the resin must have as high a latent period as possible. Said resin must allow impregnation of the fibers which are a constituent element of said preform using any suitable technique, also storage, transport of said preform, and it must have a positioning period in the well or line (which is usually hot), without the polymerization reaction commencing or advancing too far. It is also vital for the resin used to endow the polymerized preform with good mechanical properties, resistance to hydrothermal ageing (i.e., hydrolysis at the service temperature), a high chemical resistance and as low an absorption as possible in water, petroleum and a variety of effluents present in the service medium.

DETAILED DESCRIPTION OF THE INVENTION

The present invention concerns flexible preforms normally containing resin compositions with a long latent period and with a glass transition temperature of at least 90° C., preferably at least 120° C., and usually at least 180° C. These resins comprise at least one resin comprising in its chemical formula at least one reactive multiple bond (normally a double bond) that can subsequently react with compounds comprising in their constitution at least one multiple bond, preferably a plurality of terminal reactive multiple bonds (normally double bonds) or reactive multiple bonds positioned at one end or the other of the molecular chain and/or in a pendant group (on a side chain with respect to the main chain), optionally associated with at least one oligomer and/or at least one polymerisable monomer comprising at least one reactive multiple bond (normally a double bond) in their chemical formula that can subsequently react with compounds comprising in their constitution at least one multiple bond, preferably a plurality of reactive multiple bonds (normally double bonds) that are terminal or positioned at one end or the other of the molecular chain and/or on a pendant group (on the side chain compared with the main chain). Examples of such products that can be cited are vinyl, acrylic, methacrylic, allyl and maleic compounds. The resins used in the present invention include a family or sub-family mainly used either alone or in a mixture or combined in the same chemical formula, in which case the flexible preform will contain at least two different resins. These two families will be defined below. Within the context of the present description, the term "resin" means pre-polymers, i.e., compounds which under certain conditions can form polymeric compounds with molecular weights that are higher than those of said pre-polymers.

Said family includes unsaturated polyester resins, usually synthesized from at least one saturated or unsaturated polyol, and at least one saturated or unsaturated dibasic acid or anhydride, at least one of these compounds being an unsaturated compound. Certain of these resins may contain in their composition urethane groups or, optionally, other groups that can react with the unsaturated bond(s) contained in said resin.

Non limiting examples that can be cited are:

for the polyols: butylene glycols, neopentyl glycol, neopentyl glycols substituted by halogens such as brominated neopentyl glycol, trimethylpentanediol, 1,4-cyclohexane-dimethanol, heavy diols obtained from bisphenol A, bisphenol F, bisphenol AF, the above bisphenols but oxyalkylated, such as oxyethylated or oxypropylated bisphenol A, F and AF, the formulae cited above comprising at least one halogen, for example chlorine and/or bromine on the aromatic nucleus/nuclei. It is also possible to use the above products wherein the aromatic nucleus/nuclei is/are at least partially hydrogenated, heavy novolac type alcohols, and cresol-novolac type cresols;

for the saturated or unsaturated anhydride(s) and acid(s), preferably unsaturated: maleic anhydride, maleic acid, fumaric acid, itaconic acid, citraconic acid, cyclanic acids obtained, for example, from hexahydrophthalic anhydride, isophthalic and terephthalic acids, anhydrides such as tetrahydrophthalic anhydride, methylnadic anhydride, hexahydrophthalic anhydride, halogenated phthalic anhydrides such as tetrachlorophthalic anhydride, tetrabromophthalic anhydride or hexachloro-endomethylene tetrahydrophthalic anhydride.

Said sub family comprises vinyl ester resins.

This category includes all resins produced by reacting compounds comprising at least one di-epoxy compound with unsaturated acids, for example acrylic type acids. Examples of compounds comprising at least one di-epoxy compound that can be cited are polyepoxy compounds synthesized from bisphenol A, bisphenol F, bisphenol AF and novolac and cresol-novolac resins. Examples of acrylic type unsaturated acids that can be cited are acrylic acid and methacrylic acid. This sub-family also includes certain commercially available vinyl ester type compositions from the EBECRYL® series from UCB Chemicals, DIACRYL® from AKZO NOBEL, ATLAC® from DSM, and DERAKANE® from DOW Chemicals.

The polymer resins from the family and sub-family cited above can either be mixed together or diluted with other saturated and copolymerisable monomers and/or oligomers that are then considered to be reactive solvents.

Examples that can be cited are: styrene, trimethylolpropane triacrylate, divinyl benzene, butyl acrylate, tert-butyl acrylate, 2-ethylhexyl acrylate, methyl acrylate, ethyl acrylate, hydroxypropyl acrylate, 2-hydroxyethyl acrylate, methyl methacrylate, ethyl methacrylate, monochlorostyrene, dichlorostyrene, monobromostyrene, dibromostyrene, vinyl toluene, vinyl acetate, diallyl orthophthalate, diallyl isophthalate, triallyl cyanurate, triallyl carbonate, diallylglycol carbonate, and bisphenol A, F or AF acrylate or dimethacrylate, dioxyalkylated or polyoxyalkylated bisphenol A, F or AF diacrylate or dimethacrylate in which the alkyl group(s) contain 2 to 24 carbon atoms, for example diethoxylated or tetraethoxylated compounds. The following products can be added to the products cited above: at least one commercially available composition not falling within the sub family of vinyl ester polymers that are normally either in the form of monomers, or in the form of oligomers or pre-polymers from the EBECRYL® series from UCB Chemicals, the DIACRYL® series from AKZO NOBEL, the ATLAC® series from DSM, and the DERAKANE® series from DOW Chemicals. Of the commercially available compositions also used in the present invention either in the form of monomers, oligomers or pre-polymers, certain are considered by the skilled person to form part of the EBECRYL® series from UCB Chemicals, the DIACRYL® series from AKZO NOBEL, the ATLAC® series from DSM, and the DERAKANE® series from DOW Chemicals.

Polymerization of the resin or mixtures containing at least one of the resins defined above, optionally at least one of the unsaturated and copolymerisable monomers and/or oligomers that are then considered to be reactive solvents, is initiated by the service temperature of the flexible preform by selecting a suitable initiator selected from the group formed by organic peroxides, such as ketone peroxides, hydroperoxides, diacyl peroxides and peresters. Other reaction initiators can be used, for example 2,2'-azobis (isobutyronitrile), 2,2'-azobis(2-methylbutyronitrile), usually abbreviated by the skilled person to AIBN, standing for azoisobutyronitriles, or other initiators such as $K_2S_2O_8$, or sulfur. Depending on the case, this or these initiator(s) can be associated with at least one polymerization inhibitor such as hydroquinones or tert-butyl catechol, or the polymerization reaction can be accelerated by the presence of at least one accelerator such as a cobalt salt and/or a tertiary amine. The scope of the present invention encompasses using one or more radical initiators and optionally one or more inhibitors.

The compositions contained in the flexible preform of the present invention must satisfy the following service conditions so as to be able to be used for producing said flexible preform s of the present invention:

they must provide a pot life (storage life) or storage period when impregnated with reinforcing fibers, for example glass fibers or the like, of 20 days of more, normally about 30 days to about 4 months, and usually about 30 days to 2 months, for an average storage temperature of 22° C. or less, normally about 0° C. to about 15° C. and usually about 0° C. to about 5° C.;

they must provide a pot life at 22° C. or storage period when impregnated into a support under the conditions described above, with a residual latent period of at least three hours, preferably at least six hours, at a temperature of about 10° C. to about 90° C., usually at least eight hours at a temperature of about 20° C. to about 80° C., for example around about 50° C.;

on pot storage or impregnated into a fibrous support for a period of use of at least 60 days, normally about 60 days to about 6 months, and usually about 60 days to about 3 months at a temperature of 4° C. or less, normally about −5° C. to about +5° C. and more usually about −5° C. to about 0° C., they must provide a residual latent period of at least 8 hours, preferably at least 10 hours and usually at least 11 hours, at a temperature of about 40° C. to about 80° C., usually about 50° C. to about 75° C., for example about 70° C.;

they must be capable of being deposited on fibrous supports, for example nonwoven or 2D or 3D woven fibers normally constituting reinforcement for the flexible preform. Examples of fibrous supports that can be cited are glass fibers, basalt fibers, carbon fibers, KEVLAR®, ceramic fibers, natural fibers, synthetic fibers and metal fibers. The fibrous supports cited above can be coated with resins manually or by pressure or vacuum injection using a RTM (resin transfer molding) technique;

preferably, compositions with a relatively low dynamic viscosity are used to allow proper impregnation of the fibers forming the structure of the preform. At the temperature selected during fiber impregnation, for example about 20° C. to about 70° C., this dynamic viscosity will be usually be less than about 2500 mPa·s (millipascal second) and normally about 300 to about 2000 mPa·s; it can be of the order of 1500 mPa·s;

they must satisfy hygiene and safety regulations;

they must not be aggressive chemically, particularly after inflation of the internal and external elastic skins constituting the protection for the preform;

they must have a polymerization temperature that is compatible with the heat resistance of the polymers and elastic skins constituting the preform walls, i.e., normally a polymerization temperature of 160° C. or less, usually 140° C. or less;

they must have the shortest possible polymerization period at the desired polymerization temperature, for example a polymerization period at 140° C. or at most 9 hours, preferably at most 8 hours. This period will, for example, be at most 7 hours at 150° C. to at most 6 hours at 160° C. Usually, the polymerization period will be at most 6 hours at 150° C. or at most 5 hours at 160° C.

The compositions from the examples cited above must:

provide, after resin polymerization, a material with good mechanical properties, these properties being at least equal to those obtained with epoxy resins impregnating the same fibrous supports as those cited above;

they must have a minimum absorption of petroleum or products present in the oil well, normally less than about 3%, usually less than about 1% at a temperature of about 90° C.;

finally, they must have a minimum water absorption, preferably less than 4% by weight, usually less than 3% by weight at 90° C.

In a particular implementation of the invention, the compositions of the invention contain a flow regulator. Depending on the choice of product, this flow regulator can act as a post-polymerization shrinkage reducing agent. This addition or association of at least one flow regulator can prevent the resin from flowing by draining out when the preform deploys as the impregnated layers are pressed together. The quantity of resin used is normally about 40 volume % to about 60 volume %, with the complement to 100% being essentially formed by fibers. Usually, the quantity by volume of resin and fibers is substantially equal. This flow regulator can maintain the fiber/matrix volume ratio, which is preferably about 1:1. This ratio is that which can produce the best mechanical properties for the composite and the least shrinkage after the polymerization step. As examples of agents that can produce the properties described above can be cited: polystyrene, polyvinyl acetate, polymethylmethacrylate, saturated polyesters, and polycaprolactames. The proportion of flow regulator is normally about 1% to 15% by weight with respect to the final composition weight. In particular, the flexible preforms of the present invention are used to repair or line sleeves or lines and their curing by polymerization is usually by means of radical type polymerization initiators such as organic peroxides where the reaction initiation temperature is appropriate for the temperature of said well or line.

Examples 1 to 6 and the tests employed will now be described with the aim of demonstrating the principal advantages and properties provided by the choice of formulations used to produce the flexible preforms of the present invention, with reference to the use of an epoxy resin to form identical flexible preforms with the exception of the resin used. These tests were carried out with the resins and hardeners shown below.

Formulation 1

Commercially available vinyl ester resin (in accordance with the invention). 100 g of EBECRYL® 616 resin from UCB (epoxydimethacrylate oligomer diluted with 25%

Formulation 2

Experimental formulation and resin (in accordance with the invention)

3 pwhr of BC 500 inhibitor from SCPO was added to 100 g of RTC 144222-12 resin, an experimental resin based on bisphenol A methacrylate from DOW Deutschland Inc., in solution in EBECRYL® 150 from UCB.

Formulation 3

Epoxy resin, known and described in the prior art in European patent application No. 833,036 (comparison).

41.3 g of M-DEA amine (4,4-methylene bis(2,6-diethylaniline)) LONZACURE® from LONZA Ltd. was added to 100 g of DGEBA (diglycidyl ether of bisphenol A) LY556 epoxy resin from CIBA.

Formulations 1 and 2 were then polymerized for 2 hours at 120° C. and formulation 3 was polymerized for 8 hours at 140° C.

EXAMPLE 1

The test carried out in this example consisted of determining the behavior and strength of HNBR rubber (hydrogenated nitrile rubber) in the presence of reactive solvents used in the unsaturated resin composition. This example illustrates the importance of selecting the reactants as a function of the strength of the elastic skins constituting the flexible preform. The swelling was measured by weighing twice after immersing for 90° C. in the following fluids:

styrene;

(1) trimethylolpropane triacrylate TMPTA;

(2) EBECRYL® 150: a bisphenol A diacrylate oligomer derivative from UCB;

(3) DIACRYL® 101: a diethoxylated dimethacrylate bisphenol A derivative from AKZO NOBEL The decline in mechanical properties was determined using a tensile testing machine in accordance with standards NFT [French standard] 46-002 and ISO 37 using an H-shaped test sample H2 cut from vulcanized HNBR rubber sheets. The draw rate was 50 millimeters per minute (mm/min).

TABLE 1

| Reactive solvents | Swelling, weight % | Decline in mechanical properties, % |
|---|---|---|
| Styrene | 220 | 100 |
| TMPTA[1] | 24 | 36 |
| Ebecryl ® 150[2] | 6 | 10 |
| Diacryl ® 101[3] | 7 | 8 |

EXAMPLE 2

Gel Time as a Function of Temperature of Hot Well or Lines for Lining

The gel time is the time required, for a given temperature and a given composition, to reach a degree of polymerization $X_g$. This degree of polymerization $X_g$ at the gel point is an important factor as it is linked to a major rheological change due to the irreversible transformation of a viscous liquid into a viscoelastic gel. The gel time was measured using a commercially available apparatus, the TROMBOMAT® sold by PRODEMAT, which could determine the onset of the gel point and evaluate the reactivity of the hardener by monitoring the kinetics of the reaction.

This example (Tables 2 and 3) illustrates the importance of peroxide and inhibitor on the latent period (gel time), necessary when positioning flexible preforms in hot wells. The resin selected for this example was EBECRYL® 616 from UCB.

TABLE 2

Influence of peroxide on latent period

| | Ebecryl ® 616 | | | Comparison |
|---|---|---|---|---|
| Resins Peroxide, 2 pwhr | Trigonox C[1] | Perkadox BC[2] | Chaloxyd BCUP[3] | Epoxy formulation 3 |
| Gel time at 70° C. | 30 min | 10 h 40 min | 1 h 15 min | 15 h 00 min |

[1]Trigonox ® C: tert-butyl peroxybenzoate
[2]Perkadox ® BC: Dicumyl peroxide
[3]Chaloxyd ® BCUP: tert-butylcumyl peroxide

TABLE 3

Influence of proportion of inhibitor

| Vinyl ester 100 pwhr<br>Peroxide 3 pwhr | Ebecryl 616<br>Perkadox ® BC | | | Comparison<br>Epoxy |
|---|---|---|---|---|
| Inhibitor BC 500[(1)] | 1 pwhr | 2 pwhr | 3 pwhr | formulation 3 |
| Gel time at 70° C. | 8 h<br>40 min | 10 h<br>48 min | 13 h<br>30 min | 14 h 00 min |

[(1)]BC500 inhibitor from SCPO: 2,6-ditert-butyl-4-methylphenol, 40% in xylene (mixture of o, m and p).

The test results shown in Tables 2 and 3 demonstrate the importance of the formulation on the latent period of the resin which can therefore be adjusted as a function of the temperature of the well or lines to be repaired.

EXAMPLE 3

Glass Transition Temperatures Obtained and Saturation Absorption Values of Liquids at 70° C.

The glass transition temperature was measured using a KINEMAT® apparatus from PRODEMAT. The temperature rise was 2° C. per minute from 20° C. up to 250° C. The glass transition temperature marks the transition from the glassy state to the rubbery state and thus determines the temperature limitations of the resins obtained from formulations 1, 2 and 3 can be used.

These resins were obtained by polymerization for 2 hours at 120° C. for formulations 1 and 2 and 8 hours at 140° C. for formulation 3.

Absorption of seawater and diesel (considered representing petroleum for the purposes of the tests below) in the case of polymerisable heat curing resins results in a gradual variation in the rigidity of the mesh of the cross-linked network. This liquid fixing causes a change in the glass transition temperature and encourages either degradation by hydrolysis of the resin or the interfaces with the reinforcing fibers, or physical degradation of the three-dimensional network by swelling thereof. It is thus important for the heat curable resins used in this context when repairing wells to have the smallest possible water and diesel absorption capacities. The seawater used was reconstituted using the procedure described in American standard ASTM D-1 141-90. The diesel employed was a 250–350° C. cut and had the designation Diesel API type 2. Comparative measurements of water and diesel absorption were carried out on already polymerized 50×50×5 millimeter resin test samples. The liquid absorption was measured by mass difference at regular intervals until saturation was reached, i.e., to constant weight, to give a water or diesel fixing ratio as a percentage by weight for each test sample obtained by polymerization under the conditions mentioned above for compositions with formulae 1 to 3. The results obtained are shown in Table 4 below:

TABLE 4

Glass transition temperature and liquid saturation absorption at 70° C.

| | Glass transition<br>temperature $T_g$, ° C.<br>after polymerization | % by weight of $H_2O$ | % by weight of API<br>type 2 fuel (diesel) |
|---|---|---|---|
| Formulation 1 | 170 | 2.9 | 0.3 |
| Formulation 2 | 120 | 2.6 | 0.3 |
| Formulation 3 | 157 | 1.8 | 2 |

EXAMPLE 4

Mechanical Properties on Unidirectional Carbon Composite

The apparent interlaminar shear strength was measured using an INSTRON 1175 machine using the procedure described in the ISO/FDIS 14130-1997 standard. The test composite was constituted by a volume ratio of 50% of resin obtained by polymerization from formulations 1, 2 and 3 using the procedures described above and 50% of TORAY carbon fibers sold under reference number CAFT 300B. The results shown in Table 5 below take into account the values obtained for the samples at the initial manufacturing time and after ageing for 1 year hydrolytically (i.e., in the presence of water) at 50° C. This ageing step thus integrates problems due to the cross-linked network caused by water and degradations of the fiber-matrix interface.

TABLE 5

Mechanical properties of composite - hydrolytic ageing

| Composite: | Value of interlaminar stress, MPa | |
|---|---|---|
| Carbon + resin | t = 0 | t = 1 year |
| Formulation 1 | 75 | 67 |
| Formulation 2 | 80 | 69 |
| Formulation 3 | 73 | 69 |

EXAMPLE 5

Lining an Experimental Well with a Vinyl Ester Organic Matrix

A sealed preform constituted by an HNBR elastomer skin encasing a pre-impregnate constituted by TORAY CAFT 300B carbon fibers and an organic matrix constituted by formulation 1 in a 50/50 v/v fiber/matrix ratio was produced in the workshop then stored at 5° C. for 30 days. This cold storage simulated the workshop/site transport. This preform, in its compact form, was then introduced into a well at 70°

C. Positioning of this preform in a test well for 7 hours before inflation and deployment thereof simulated it being positioned in a very deep well. After inflating, deployment and molding of the preform against the well wall under the pressure of the liquid present in the wells, the polymerization phase was carried out using resistance heating integrated into the preform for 2 hours at 120° C. The composite lining obtained is compared with that obtained in Example 6 below in Table 6.

EXAMPLE 6

Lining an Experimental Well with an Organic Epoxy Matrix

This example had the same technical features as those of Example 5, with the exception that the impregnating resin was different. In this example, the epoxy resin described above in formulation 3 was used. The polymerization period for this example was 8 hours at 140° C.

The apparent tensile strength of rings cut from the linings obtained from Examples 5 and 6 was determined using an INSTRON 1175 tensile strength machine using the slotted disk method described in American standard ASTM D-2290 1992. This apparent stress at rupture was expressed in MPa (megapascals). This measurement, carried out at 20° C., allowed the tear strength of the linings to be assessed.

TABLE 6

| Composition of organic matrix of composite | Apparent tensile stress, MPa |
| --- | --- |
| Example 5 (formulation 1) | 1046 |
| Example 6 (formulation 3) | 1150 |

Clearly, the results obtained from Examples 2 to 6 above show that heat curable formulations with a glass transition temperature of at least 100° C. and comprising reactive double bonds in their chemical formulations, can be used to line wells or casings or lines that are usually hot.

These uses are possible provided that their compositions are adjusted as a function of the service temperature and the strength of the elastic skins constituting the flexible preforms. Examples 2 to 6 show that when formulated suitable, the properties of unsaturated heat-curing resins can be comparable to those of epoxy resins used under the same conditions. It should also be noted that resins obtained by polymerizing chemical formulations comprising reactive double bonds have a distinct advantage since they adsorb a smaller amount of diesel than that absorbed by epoxy resins and further, the quantity of water adsorbed is not significantly higher.

The entire disclosure of all applications, patents and publications cited above and of corresponding French application 00/01617, filed Feb. 4, 2000, are hereby incorporated by reference.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A well or pipe repair product comprising a radially deployable flexible preform to form, after deploying, a tubular structure that is curable by polymerization after positioning it in a well or in a line and moulds to the shape thereof after curing, comprising in its constitution at least one resin of an unsaturated polyester resin synthesized from at least one saturated or unsaturated polyol, and tetrachlorophthalic anhydride, tetrabromophthalic anhydride, or hexachloro-endomethylene tetrahydrophthalic anhydride, comprising in its chemical formula at least one reactive multiple bond that has a dynamic viscosity of less than about 2500 mPa·s at a temperature of about 20° C. to about 70° C., and is capable of subsequent reaction with compounds comprising in their constitution at least one terminal reactive multiple bond or a reactive multiple bond positioned at one end or the other of the molecular chain and/or on a pendant group, wherein the preform contains at least one resin with a residual latent period, after storage at 22° C. for a period of 20 days or more, of at least 3 hours at a temperature of about 10° C. to about 90° C.

2. A well or pipe repair product according to claim 1, wherein the polyol used to synthesize the unsaturated polyester is a butylene glycol, a neopentyl glycol, a neopentyl glycol substituted by at least one halogen, a trimethylpentanediol, a 1,4-cyclohexane-dimethanol, a heavy diol obtained from bisphenol A, a bisphenol F, a bisphenol AF, an oxyalkylated bisphenol comprising at least one halogen on the aromatic nucleus/nuclei, an above product wherein the aromatic nucleus/nuclei is/are at least partially hydrogenated, a heavy novolac alcohol, or a cresol-novolac cresol.

3. A well or pipe repair product according to claim 1, containing at least two different resins.

4. A well or pipe repair product according to claim 1, containing at least one resin comprising in its chemical formula at least one multiple bond, wherein the at least one resin further comprises at least one monomer not forming part of the sub family of polymer vinyl esters, or of oligomers or pre-polymers of a bisphenol A derivative diacrylate oligomer, an epoxydimethacrylate oligomer diluted with trimethylolpropane diacrylate, or a diethoxylated dimethacrylate bisphenol A derivative.

5. A well or pipe repair product according to claim 1, wherein the resin polymerization reactions are initiated as a function of the service temperatures employed for the flexible preform by selecting at least one suitable initiator of an organic peroxide.

6. A well or pipe repair product according to claim 1, wherein the resin polymerization reactions are initiated as a function of the service temperatures employed for the flexible preform by at least one initiator comprising azoisobutyronitrile.

7. A well or pipe repair product according to claim 1, wherein the resin polymerization reactions are initiated as a function of the service temperatures employed for the flexible preform by at least one initiator of a sulfur or a potassium persulfate with molecular formula $K_2S_2O_8$.

8. A well or pipe repair product according to claim 5, wherein the resin polymerization reactions are initiated as a function of the service temperatures employed for the flexible preform by at least one initiator associated with at least one accelerator comprising a cobalt salt and/or a tertiary amine.

9. A well or pipe repair product according to claim 5, wherein the resin polymerization reactions are initiated as a function of the service temperatures employed for the flexible preform by at least one initiator associated with at least one polymerization inhibitor comprising a hydroquinone or tertiobutyl catechol.

10. A well or pipe repair product according to claim 1, containing at least one resin with a residual latent period, after storage at 4° C. or less for a period of at least 60 days, of at least 8 hours at a temperature of about 40° C. to about 80° C.

11. A well or pipe repair product according to claim 1, wherein the resin comprising at least one reactive multiple bond in its formula that can subsequently react with compounds comprising in their constitution at least one terminal reactive multiple bond or a reactive multiple bond located at one end or the other of the molecular chain and/or in a pendant group is selected from the group formed by resins that enable manual, mechanical or pressure or vacuum injection impregnation of fibrous supports comprising at least one glass fiber, basalt fiber, carbon fiber, ceramic fiber, natural fiber, synthetic fiber, or metal fiber constituting the reinforcement of said flexible preform.

12. A well or pipe repair product according to claim 1, wherein the resin comprising at least one reactive multiple bond in its formula that can subsequently react with compounds comprising in their constitution at least one terminal reactive multiple bond or a reactive multiple bond located at one end or the other of the molecular chain and/or in a pendant group is a non aggressive chemical resin.

13. A well or pipe repair product according to claim 1, wherein the resin comprising at least one reactive multiple bond in its formula that can subsequently react with compounds comprising in their constitution at least one terminal reactive multiple bond or a reactive multiple bond located at one end or the other of the molecular chain and/or in a pendant group is a resin with a polymerization temperature compatible with the heat resistance of the polymer, an elastic skin, and the at least one component constituting the preform walls.

14. A well or pipe repair product according to claim 13, wherein the resin polymerization temperature is 160° C. or less.

15. A well or pipe repair product according to claim 1, wherein the resin comprising at least one reactive multiple bond in its formula that can subsequently react with compounds comprising in their constitution at least one terminal reactive multiple bond or a reactive multiple bond located at one end or the other of the molecular chain and/or in a pendant group is a resin forming, after polymerization in combination with a fibrous support, a composite with a petroleum absorption of less than 3% by weight at a temperature of about 90° C.

16. A well or pipe repair product according to claim 1, wherein the resin comprising at least one reactive multiple bond in its formula that can subsequently react with compounds comprising in their constitution at least one terminal reactive multiple bond or a reactive multiple bond located at one end or the other of the molecular chain and/or in a pendant group is a resin forming a composite having a water absorption of less than 4% by weight at a temperature of about 90° C. after polymerization in combination with a fibrous support.

17. A well or pipe repair product according to claim 1, further comprising at least one flow regulator.

18. A well or pipe repair product according to claim 17, wherein the flow regulator is a polystyrene, a polyvinylacetate, a polymethylmethacrylate or a polycaprolactame.

19. A well or pipe repair product comprising a radially deployable flexible preform to form, after deploying, a tubular structure that is curable by polymerization after positioning it in a well or in a line and moulds to the shape thereof after curing, comprising in its constitution 100 pwhr of an epoxydimethacrylate oligomer, comprising in its chemical formula at least one reactive multiple bond that has a dynamic viscosity of less than about 2500 mPa·s at a temperature of about 20° C. to about 70° C., and is capable of subsequent reaction with compounds comprising in their constitution at least one terminal reactive multiple bond or a reactive multiple bond positioned at one end or the other of the molecular chain and/or on a pendant group, 3 pwhr of a peroxide, and 1 pwhr of an inhibitor wherein the preform contains at least one resin with a residual latent period, after storage at 2° C. for a period of 20 days or more, of at least 3 hours at a temperature of about 10° C. to about 90° C.

20. A well or pipe repair product according to claim 19, comprising 2 pwhr of an inhibitor.

21. A well or pipe repair product according to claim 19, comprising 3 pwhr of an inhibitor.

22. A well or pipe repair product comprising a radially deployable flexible preform to form, after deploying, a tubular structure that is curable by polymerization after positioning it in a well or in a line and moulds to the shape thereof after curing, comprising in its constitution 100 pwhr of a bisphenol A methacrylate, comprising in its chemical formula at least one reactive multiple bond that has a dynamic viscosity of less than about 2500 mPa·s at a temperature of about 20° C. to about 70° C., and is capable of subsequent reaction with compounds comprising in their constitution at least one terminal reactive multiple bond or a reactive multiple bond positioned at one end or the other of the molecular chain and/or on a pendant group, and 3 pwhr of an inhibitor wherein the preform contains at least one resin with a residual latent period, after storage at 22° C. for a period of 20 days or more, of at least 3 hours at a temperature of about 10° C. to about 90° C.

* * * * *

UNITED STATES PATENT AND TRADEMARK OFFICE
CERTIFICATE OF CORRECTION

PATENT NO. : 6,824,847 B2
DATED : November 30, 2004
INVENTOR(S) : Paul Mariaggi

It is certified that error appears in the above-identified patent and that said Letters Patent is hereby corrected as shown below:

Column 12,
Line 29, reads "2º C", should read -- 22º C --.

Signed and Sealed this

Tenth Day of May, 2005

JON W. DUDAS
*Director of the United States Patent and Trademark Office*